United States Patent
Bimson et al.

(10) Patent No.: US 9,811,601 B2
(45) Date of Patent: *Nov. 7, 2017

(54) CONTENT MANAGEMENT APPLICATION FOR AN INTERACTIVE ENVIRONMENT

(71) Applicant: III Holdings 1, LLC, Wilmington, DE (US)

(72) Inventors: Andrea Bimson, Scottsdale, AZ (US); Jin Chyung, Hamburg (DE); Meena Gopakumar, Glendale, AZ (US); Lorraine Miranda, Phoenix, AZ (US); Biswajit Sarkar, Phoenix, AZ (US); Shashikant Rao, Phoenix, AZ (US); Kaustubh Kunte, Phoenix, AZ (US)

(73) Assignee: III Holdings 1, LLC, Wilmington, DE (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/682,921

(22) Filed: Apr. 9, 2015

(65) Prior Publication Data

US 2015/0213146 A1 Jul. 30, 2015

Related U.S. Application Data

(63) Continuation of application No. 13/467,601, filed on May 9, 2012, now Pat. No. 9,015,232, which is a
(Continued)

(51) Int. Cl.
*G06F 17/30* (2006.01)
*G06F 17/24* (2006.01)
*G06F 17/21* (2006.01)

(52) U.S. Cl.
CPC ...... *G06F 17/30893* (2013.01); *G06F 17/211* (2013.01); *G06F 17/24* (2013.01); *G06F 17/248* (2013.01); *G06F 17/3089* (2013.01)

(58) Field of Classification Search
CPC ..... G06F 17/3089; G06F 17/24; G06F 17/212
(Continued)

(56) References Cited

U.S. PATENT DOCUMENTS

| | | |
|---|---|---|
| 5,008,853 A | 4/1991 | Bly et al. |
| 5,488,686 A | 1/1996 | Murphy et al. |

(Continued)

FOREIGN PATENT DOCUMENTS

| | | |
|---|---|---|
| EP | 0387462 | 9/1990 |
| WO | 9801807 | 1/1998 |
| WO | 9966425 | 12/1999 |

OTHER PUBLICATIONS

International Preliminary Examination Report in Application No. PCT/US2001/02421 mailed Dec. 19, 2002, 11 pages.
(Continued)

*Primary Examiner* — Lashonda Jacobs
(74) *Attorney, Agent, or Firm* — Meyertons, Hood, Kivlin, Kowert & Goetzel, P.C.

(57) ABSTRACT

The content management application is an intranet application which provides a process for implementing changes to an internet website of a company by providing the company the ability to define and enforce a common style of page layout. The application can be accessed via a desktop browser and multiple users may access the application for multiple reasons at the same time. The application also dynamically generates new page designs and new component design with various people assigned to groups or teams enabling the continuous creation and processing of content. Once the content is created and reviewed, it is then launched onto the company's internet site for viewing by the internet users accessing the company's web page.

20 Claims, 8 Drawing Sheets

Related U.S. Application Data continuation of application No. 13/273,120, filed on Oct. 13, 2011, now Pat. No. 8,195,787, which is a continuation of application No. 13/099,267, filed on May 2, 2011, now Pat. No. 8,065,407, which is a continuation of application No. 12/885,307, filed on Sep. 17, 2010, now Pat. No. 7,958,223, which is a continuation of application No. 12/106,883, filed on Apr. 21, 2008, now Pat. No. 7,818,411, which is a continuation of application No. 11/458,851, filed on Jul. 20, 2006, now Pat. No. 7,401,138, which is a continuation of application No. 09/897,858, filed on Jul. 2, 2001, now Pat. No. 7,117,260, which is a continuation of application No. 09/769,924, filed on Jan. 25, 2001, now abandoned.

(60) Provisional application No. 60/178,376, filed on Jan. 27, 2000.

(58) Field of Classification Search
USPC ......... 709/203, 205, 18, 219, 223, 224, 218; 707/1, 2, 5, 7, 9, 10, 104.1, 202; 715/513
See application file for complete search history.

(56) References Cited

U.S. PATENT DOCUMENTS

| | | | |
|---|---|---|---|
| 5,706,452 A * | 1/1998 | Ivanov ..................... | 715/751 |
| 5,727,156 A | 3/1998 | Herr-Hoyman et al. | |
| 5,737,727 A | 4/1998 | Lehmann et al. | |
| 5,778,367 A | 7/1998 | Wesinger, Jr. et al. | |
| 5,794,006 A | 8/1998 | Sanderman | |
| 5,799,191 A | 8/1998 | Moriyasu et al. | |
| 5,852,435 A | 12/1998 | Vigneaux et al. | |
| 5,870,559 A | 2/1999 | Leshem et al. | |
| 5,870,744 A | 2/1999 | Sprague | |
| 5,884,035 A | 3/1999 | Butman et al. | |
| 5,907,324 A | 5/1999 | Larson et al. | |
| 5,937,197 A | 8/1999 | Jury | |
| 5,940,834 A | 8/1999 | Pinard et al. | |
| 5,945,989 A | 8/1999 | Freishtat et al. | |
| 5,956,720 A | 9/1999 | Fernandez et al. | |
| 5,958,008 A | 9/1999 | Pogrebisky et al. | |
| 5,960,404 A | 9/1999 | Chaar et al. | |
| 5,966,512 A | 10/1999 | Bates et al. | |
| 5,974,443 A | 10/1999 | Jeske | |
| 5,999,911 A | 12/1999 | Berg et al. | |
| 6,014,662 A | 1/2000 | Moran et al. | |
| 6,038,573 A | 3/2000 | Parks | |
| 6,088,702 A * | 7/2000 | Plantz et al. ............. | 707/103 R |
| 6,170,002 B1 | 1/2001 | Ouchi | |
| 6,185,587 B1 | 2/2001 | Bernardo et al. | |
| 6,263,352 B1 | 7/2001 | Cohen | |
| 6,304,886 B1 | 10/2001 | Bernardo et al. | |
| 6,308,188 B1 * | 10/2001 | Bernardo et al. ............ | 715/530 |
| 6,314,425 B1 * | 11/2001 | Serbinis et al. ................ | 707/10 |
| 6,356,903 B1 * | 3/2002 | Baxter et al. ................... | 707/10 |
| 6,393,456 B1 | 5/2002 | Ambler et al. | |
| 6,484,149 B1 | 11/2002 | Jammes et al. | |
| 6,643,663 B1 * | 11/2003 | Dabney et al. ............... | 707/102 |
| 6,745,238 B1 | 6/2004 | Giljum et al. | |
| 7,523,053 B2 | 4/2009 | Pudhukottai et al. | |
| 7,885,841 B2 | 2/2011 | King | |
| 2002/0198878 A1 * | 12/2002 | Baxter et al. .................... | 707/6 |
| 2004/0107365 A1 | 6/2004 | Hogg | |
| 2004/0216084 A1 | 10/2004 | Brown et al. | |

OTHER PUBLICATIONS

International Search Report in Application No. PCT/US2001/02421 mailed Jun. 5, 2002, 3 pages.

Israel Z. Ben-Shaul, et al., "Integrating Groupware Activities Into Workflow Management Systems," Computer Systems and Software Engineering 1996, Proceedings of the Seventh Israeli Conference on Herzliya, Israel Jun. 12-13, 1996, pp. 140-149. [XP010200469, ISBN 0-8186-7536-5].

Jeff Jurvis, "WYSIWG Web Design," Informationweek Labs, No. 603, Oct. 28, 1996, pp. 64 and 66. [XP002046592, iSSB 8750-6874].

Jay R. Freidman, "A Publisher Plays Jazz with the Intranet and Adobe Acrobat," IPCC 99, IEEE Proceedings International Professional Communication Conference, Sep. 7-10, 1999, International Professional Communication Conference (IPCC), IEEE, US, Sep. 7, 1999, pp. 391-399. [XP000897076, ISBN 0-7803-5710-8].

Preliminary Office Action in Argentine Patent Application No. P 01 01 00362 mailed Sep. 18, 2002, 5 pages.

* cited by examiner

CONTENT MANAGEMENT APPLICATION FOR AN INTERACTIVE ENVIRONMENT

CROSS-REFERENCE TO RELATED APPLICATIONS

The present application is a continuation of U.S. application Ser. No. 13/467,601 filed May 9, 2012 (now U.S. Pat. No. 9,015,232), which is a continuation of U.S. application Ser. No. 13/273,120 filed Oct. 13, 2011 (now U.S. Pat. No. 8,195,787), which is a continuation of U.S. application Ser. No. 13/099,267 filed May 2, 2011 (now U.S. Pat. No. 8,065,407), which is a continuation of U.S. application Ser. No. 12/885,307 filed Sep. 17, 2010 (now U.S. Pat. No. 7,958,223), which is a continuation of U.S. application Ser. No. 12/106,883 filed Apr. 21, 2008 (now U.S. Pat. No. 7,818,411), which is a continuation of U.S. application Ser. No. 11/458,851 filed Jul. 20, 2006 (now U.S. Pat. No. 7,401,138), which is a continuation of U.S. application Ser. No. 9/897,858 filed Jul. 2, 2001 (now U.S. Pat. No. 7,117,260), which is a continuation-in-part of U.S. Ser. No. 9/769,924 filed Jan. 25, 2001 (now abandoned), which claims priority to U.S. Prov. Appl. No. 60/178,376 filed Jan. 27, 2000; the disclosures of each of the above-referenced applications are incorporated by reference herein in their entireties.

FIELD OF THE INVENTION

The invention relates generally to methods and apparatus for implementing changes to an internet website, and more particularly, to systems for defining and enforcing a common style of website page layout for use on an internet and intranet.

BACKGROUND OF THE INVENTION

As more and more companies begin to provide a presence on the internet, they are confronted with the issues of presentation and conformity within the preparation of the presentations. Various schemes have been presented to assist the companies in preparing the presentation screens that would appear on the internet website. Such approaches have included delegated authority systems, used content aggregation, provided graphical interfaces, and dynamically generated web documents. Further, general website management has included editing and generating information, data access/processing systems, automatic publishing systems and group ware systems. These approaches generally require knowledge of an authoring language, such as, for example, Hypertext Markup Language (HTML), a capability generally understood by website programmers, but not sufficiently among general employees.

The prior art generally fans to disclose a sufficient process for implementing changes to an internet website such that employees in a corporation may define and enforce a common style of page layout. Further, it is desirable to provide an application that can be accessed by multiple users at the same time via an intranet browser, where the application allows corporate employees to manage content, create new web pages, process content through workflow, and define new content and style without requiring that the employee be proficient in an authoring language, such as HTML. It is further desirable that prior to a web page being introduced to the internet, a launch status be assigned to the page such that all appropriate employees, which form the workflow committee, review the content and proposed web page and authorize the launch to the internet. Additionally, it is desired that an access control system that can limit access to certain members within the workflow group and certain areas of the proposed web site be provided.

SUMMARY OF THE INVENTION

The present invention provides a content management application which is an intranet application for implementing changes to a website. The application provides a corporation the ability to define and enforce a common style of page layout in an intranet environment prior to introduction of the page layout to the internet website. The intranet application can be accessed utilizing a standard desktop browser and multiple users may access the application for multiple reasons at the same time. Thus, with minimal or no sufficient knowledge of an authoring language such as, for example, the HTML programming language, corporate employees may access the application to manage content, create new pages, process content through workflow, define new content style and/or the like. The content management application also dynamically generates new content for predesigned page layouts and new component layouts, the content of which within the internet can be assigned to groups or teams which enables the creation/processing of content by any member of the team.

The content management application through the use of a workflow concept indicates the status of the user such as, for example, an author, an editor, a legal reviewer, market reviewer, owner and/or the like. In the workflow, after the author drafts content for a proposed web page, the author can approve the content and it then becomes available, via the intranet, to the next member within the workflow, such as an editor. After all of the appropriate employees within the workflow review the content and proposed web page, the proposed page is assigned a launch status which allows the newly created web page to be made available on the corporation's internet site. The content management application system includes access control such that access to certain documents can be limited to only certain members within the workflow. Additionally, the access control can limit access of not only certain members, but also limit access to certain areas of the content. Thus, templates can be pre-established using a uniform style guide such that when a template is added to the web page, all the templates conform to a uniform style.

BRIEF DESCRIPTION OF THE DRAWINGS

The above and other features and advantages of the present invention are hereinafter described in the following detailed description of exemplary embodiments to be read in conjunction with the accompanying drawing figures, wherein like reference numerals are used to identify the same or similar parts or steps in the similar views, and.

DETAILED DESCRIPTION OF EXEMPLARY EMBODIMENTS

Figure 1:
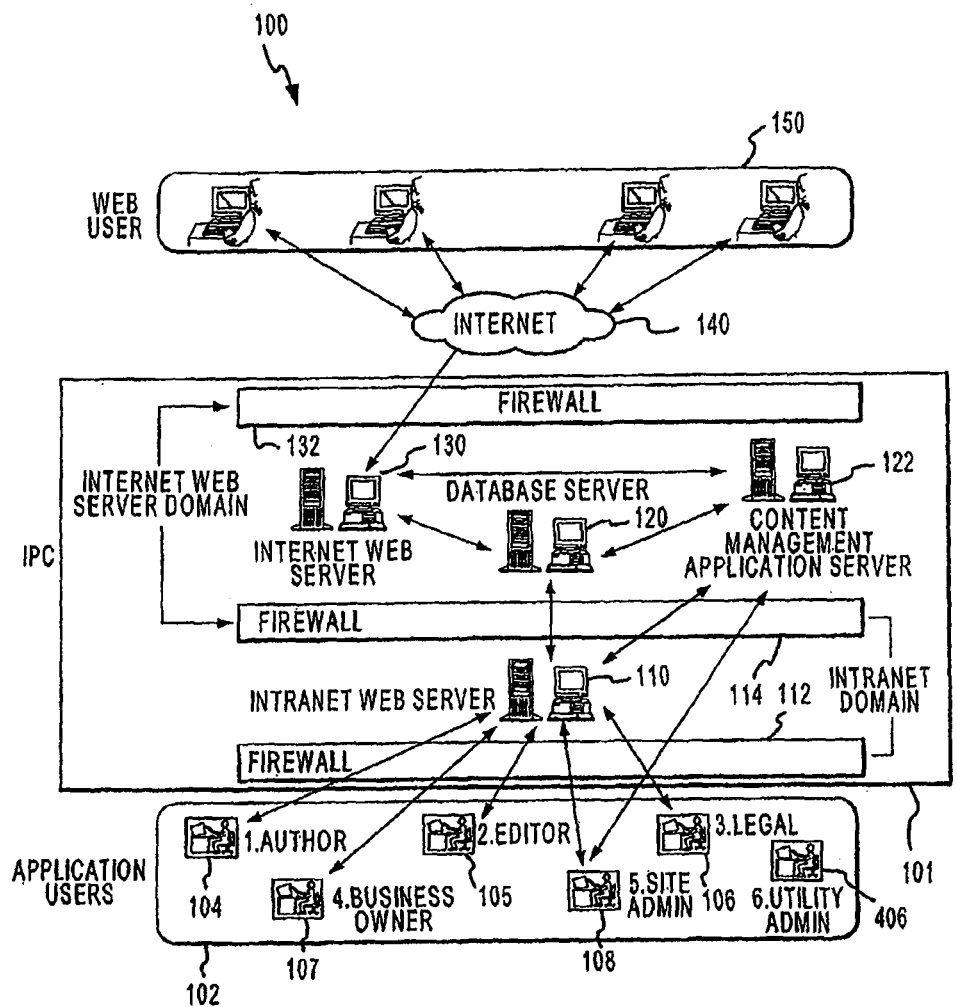
FIG. 1 is an exemplary representation of the components of the Content Management Application of the present invention.

The present invention may be described herein in terms of functional block components and various processing steps. It should be appreciated that such functional blocks may be realized by any number of hardware and/or software components configured to perform the specified functions. For example, the software elements of the present invention may be implemented with any programming or scripting language such as C, C++, Java, PERL, or the like, with the various algorithms being implemented with any combination of data structures, objects, processes, routines or other programming elements. For purposes of simplicity and only by way of example and not by way of limitation, the exemplary embodiments are described as using eXtensible Markup Language (XML). Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

The databases disclosed herein may be any type of database, such as relational, hierarchical, object-oriented, and/or the like. Common database products that may be used to implement database 103 include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

To simplify the description of the exemplary embodiment, the invention is described as pertaining to an internet and intranet system. Referring now to FIG. 1, an exemplary representation of the content management application system 100 for use in an active environment is shown. In an exemplary embodiment, the content management application is directed to a system for permitting a company to implement changes to an internet website by defining and enforcing a common style of page layout produced on an intranet server. The system suitably facilitates access to various application users 102, including an author 104, an editor 105, legal reviewer 106, the business owner 107, utility administrator 406 and/or the site administrator 108. It is to be understood that reference to the author 104, editor 105, legal reviewer 106, business owner 107, and site administrator 108/utility administrator 406 may be to an entity, group, or team as well as to an individual, hardware, or software, as these titles are related to the function performed, rather than to an individual entity.

Each user may interact with the Information Processing Center (IPC) 101 through a connection with an Intranet web server 110 which maintains the page layout for the internet web page on internet web server 130. In order to restrict unauthorized access to components within the IPC 101, connections may pass through a firewall 132. Intranet web server 110 communicates through a firewall 114 into a data base server 120. Data base server 120 additionally suitably communicates with a management application server 122 and an internet web server 130. Site administrator 108 also communicates through firewalls 112, 114 to the management application server 122 which permits the site administrator to signal the data base server 120, controlling release of an updated content web page to the internet web server 130. Web users 150 using a standard desktop browser can log onto the internet 140 and, after passing through a firewall 132, enter the secure internet web server to receive the current version of the updated web page.

Figure 2:
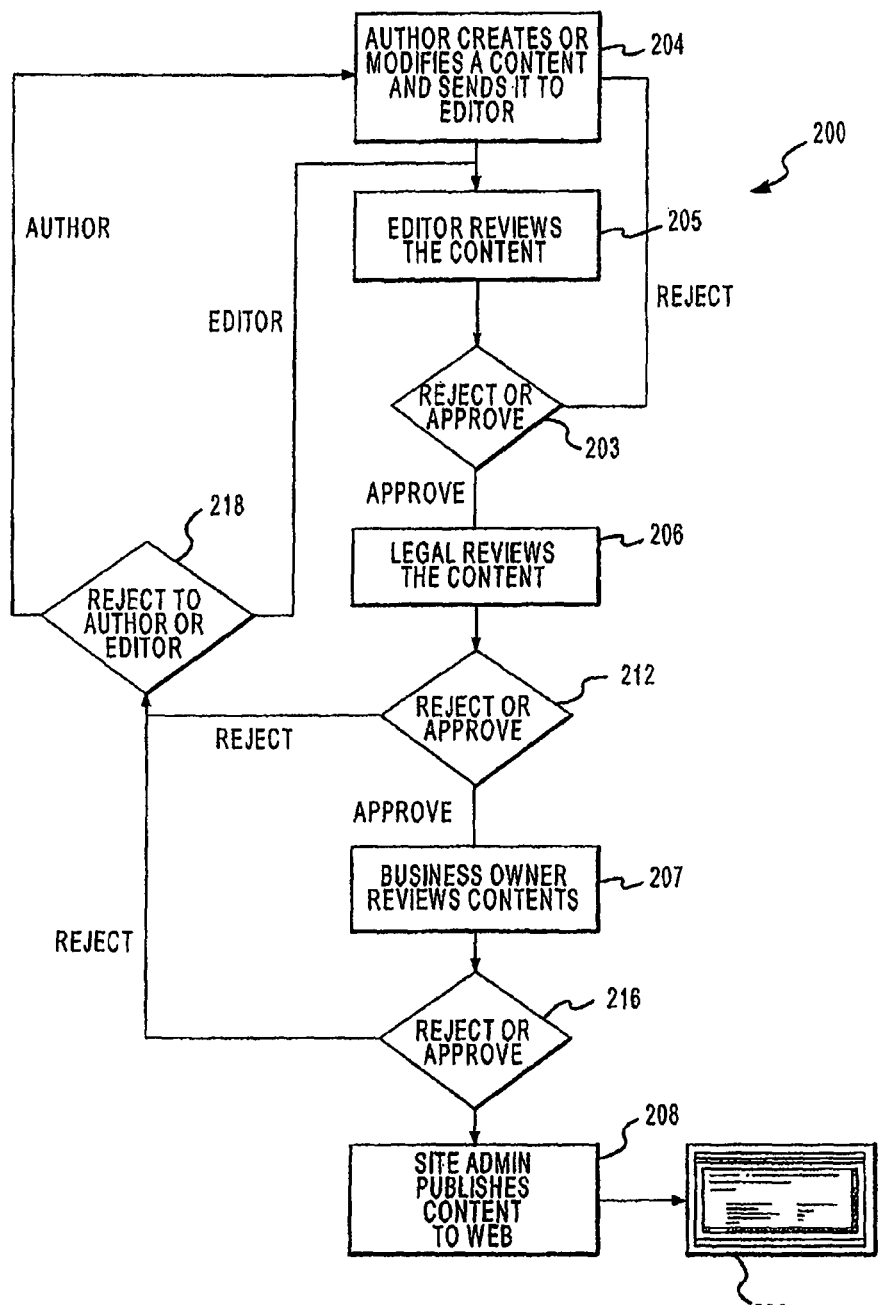
FIG. 2 is an exemplary block diagram of the workflow process of the present invention.

Referring also to FIG. 2, the figure shows an exemplary flow diagram 200 of the workflow process of the content management application associated with the application users 102 of FIG. 1. Once a project is initiated by the site administrator to create a new page or to change existing page content to be presented on a web page, an author is assigned to create or modify the content in step 204 and forwards the updated content to an editor for review and editing. The author may be tasked to create new content pertaining only to a portion of a new or an existing page rather than authoring an entire page. In step 205, the editor reviews the content and may either reject or approve the content in step 212 thereby returning it to the author for review and/or modification if rejected, or if accepted, sending it to the legal reviewer 106 for review in step 206. In step 212, the legal reviewer may reject or approve the page content received from the editor. If the page content is rejected, the legal reviewer may return it to either the author or the editor as shown in step 218. If returned to the author, the author reviews the rejection, modifies the content and again sends it to the editor, starting the process over. If sent to the editor, the editor reviews the content with regard to the comments provided by the legal reviewer and may address the legal reviewer's concerns or send the page back to the author for review and revision, again restarting the workflow process. If the legal reviewer approves the content, the page content is then sent to the business owner to review the contents at step 207. As with the legal reviewer, in step 216, the business owner may reject the content and return it to either the author or the editor for further processing as shown in step 218. If, however, the business owner approves the content, it is sent to the site administrator in step 208 for publication of the content to the web in step 230 as above described for FIG. 1.

Figure 3:
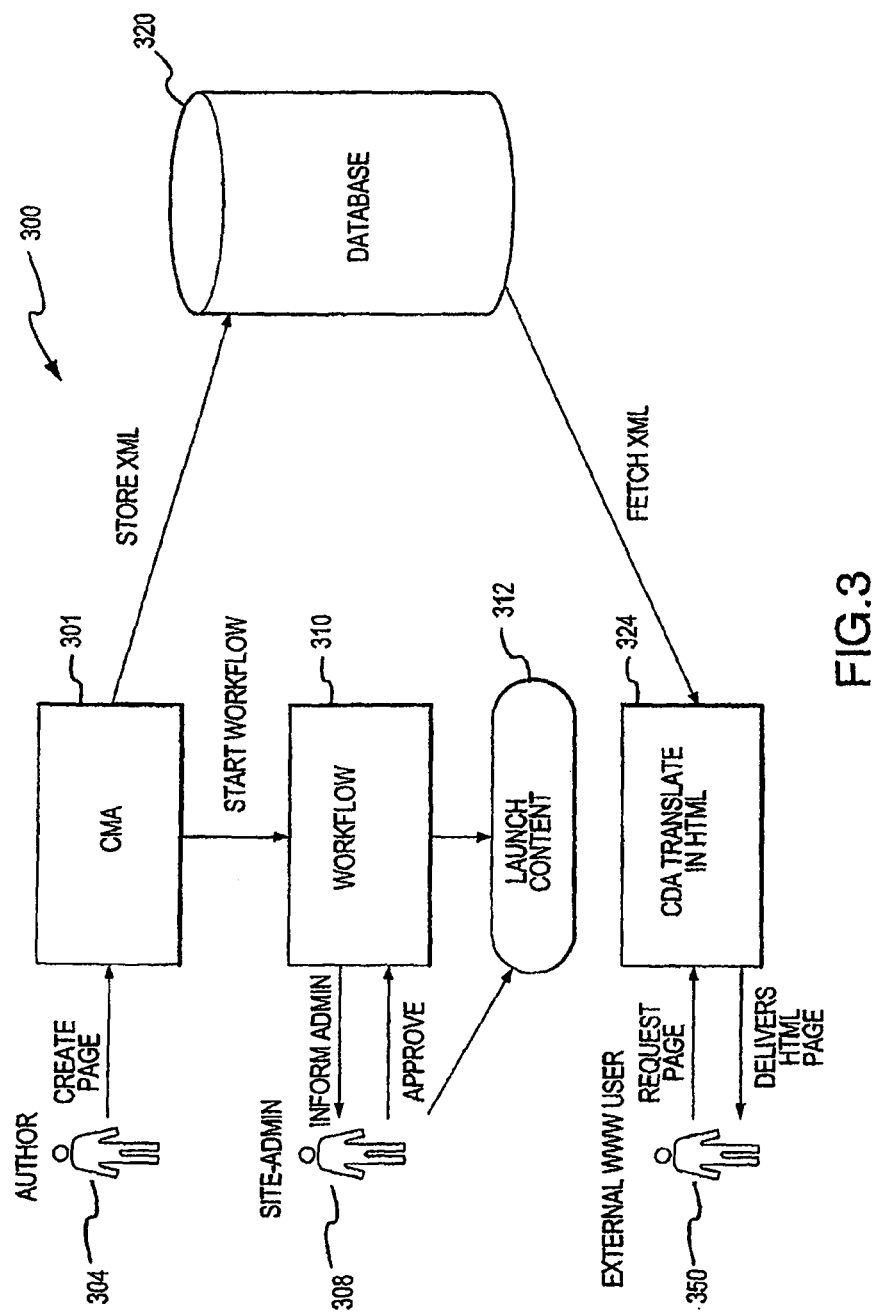
FIG. 3 is an exemplary representation of the dataflow of the present invention.

Referring now to FIG. 3, there is shown at 300 an exemplary representation of the flow diagram of FIG. 2. The creation process in the content management application 301 is, in one embodiment, initiated by an author 304 creating a page which starts the workflow 310 as above described in FIG. 2. While various scripting languages may be used in creating content and/or a page, by way of example only and not by way of limitation, the content/page is written in eXtensible Markup Language (XML) and stored in a data base 320. Once the workflow process is completed and the site administrator 308 has authorization, the updated page with the new content is launched, 312. Upon the site administrator's 308 launching, 312, the updated page content at 301 is stored as an XML file in a data base 320. At this point, an external web user 350 may request the updated page wherein the page is retrieved from the data base in XML format, processed through a Content Delivery Application (CDA) translation 324 into, for example, an HTML format and delivered as an HTML page to the user 350.

When launched, in one embodiment, the updated page content may contain an auto-expiration provision. This provision is utilized for content that has a limited time period during which the content is valid. At the end of the selected time period, the content is automatically removed from the page. Further, the present invention contains a provision for manually removing page content at any time. However, once page content has been removed, predetermined information relating to the deleted material is retained and stored. Thus, the retained content may be recalled and reproduced to provide information relating to the content as well as providing audit information (e.g., an audit log) relating to the member of the workflow process originally launching the removed page content. The audit information may indicate which member of the work flow reviewed or edited the document in order for better tracking of the content modification. The audit information may also enable better management of content with site-specific information.

Figure 4:
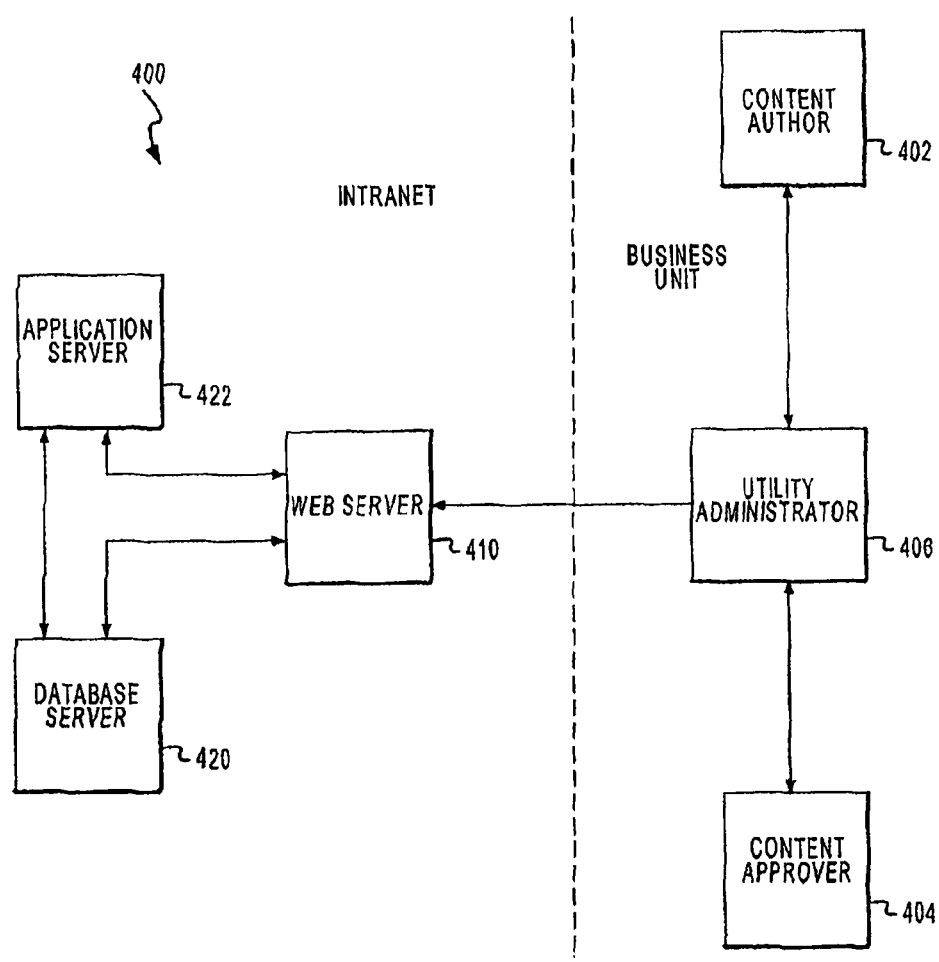
FIG. 4 is an exemplary block diagram depicting the Administrative User embodiment of the Content Management Utility of the present invention.

Referring now to FIG. 4, there is shown an exemplary embodiment of the content management application of the present invention at 400 directed to administrative user workflow. In this embodiment, the content management application is under the control of a utility administrator 406. Utility administrator 406 sets up a new account using an internet browser application to connect to the production environment. The utility administrator 406 creates workflow groups that will use the system. Users are then added to the groups and the groups are associated with the project.

As a security precaution, the administrator may verbally communicate the user ID and password to each new user. In an exemplary embodiment, the new user is previously designated as either a content author 402 or a content approver 404, which would include editor 105, legal 106, business owner, or local site administrator 108. Content authors can then create and edit content items and content approvers have the authority to approve production content as ready to be launched to the website. In this embodiment, no user of the content management application can be associated with more than one entity in the same workflow. That is, the author cannot become an approver of his own work product. Once the new page content has been approved, it is presented to the utility administrator 406 for distribution. Utility administrator 406 approves the content as a final step in the workflow and releases it to intranet web server 410, which then distributes the upgraded web page to the application server 422 and the data base server 420 for presentation to the internet website of the company.

Figure 5:
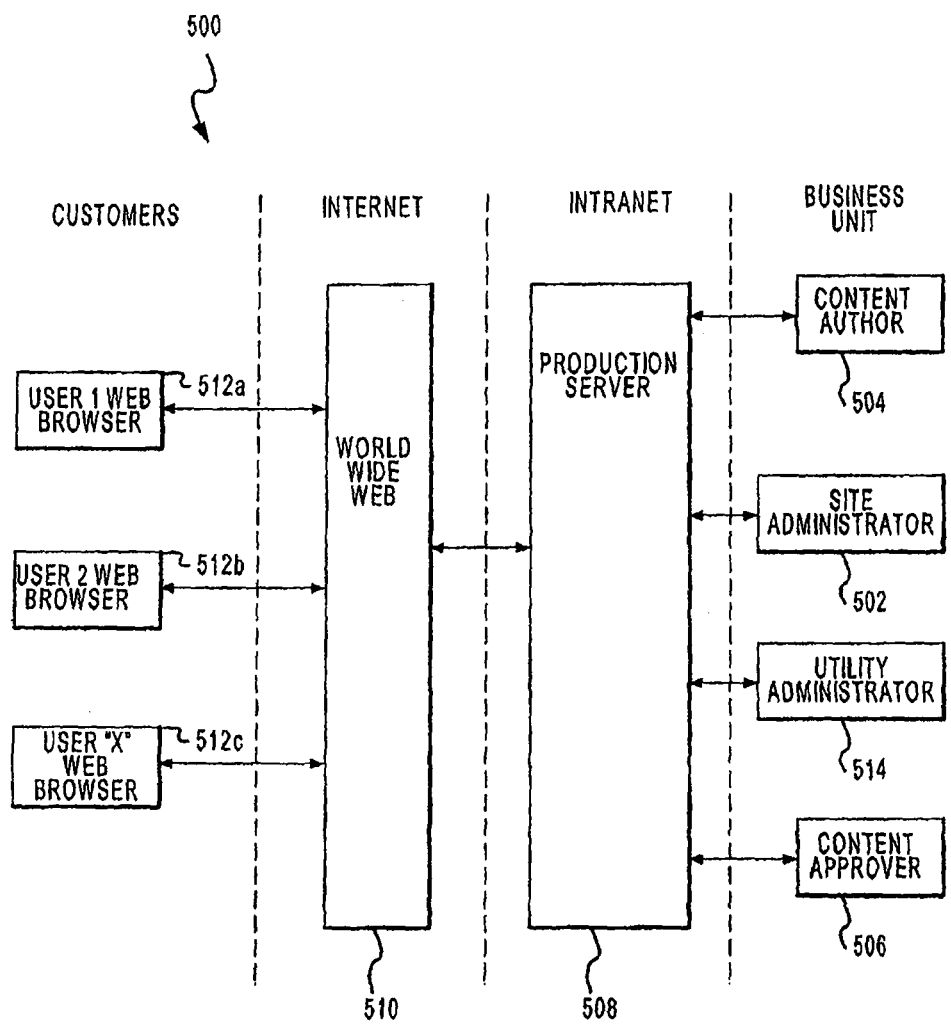
FIG. 5 is an exemplary block diagram depicting the Non-Administrative User/Workflow embodiment of the Content Management Utility of the present invention.

Referring now to FIG. 5, an alternate exemplary embodiment of the content management application is shown at 500. This embodiment is directed to the non-administrative user workflow group under control of the local site administrator 502. Once the site administrator 502 initiates a project and verbally communicates the user ID and password to each new user designated in the workflow, designated content authors 504 can log directly onto a production server 508 and create and edit items using content entry templates accessed via a web browser. Additionally, designated content approvers 506, such as have been previously described, may log directly onto the production server 508 in the intranet and preview content items using a web browser. Content approvers can then mark items as approved or rejected as previously discussed in FIG. 2, using the intranet based application. When the new content has been approved by all or a predetermined number or list of concerned users in the workflow, the utility administrator 514 will then launch the content. Content is launched by the production server 508 to the worldwide web 510 on the internet. At this point, users 512a, 512b, and 512c may access the newly added content pages.

Figure 6:
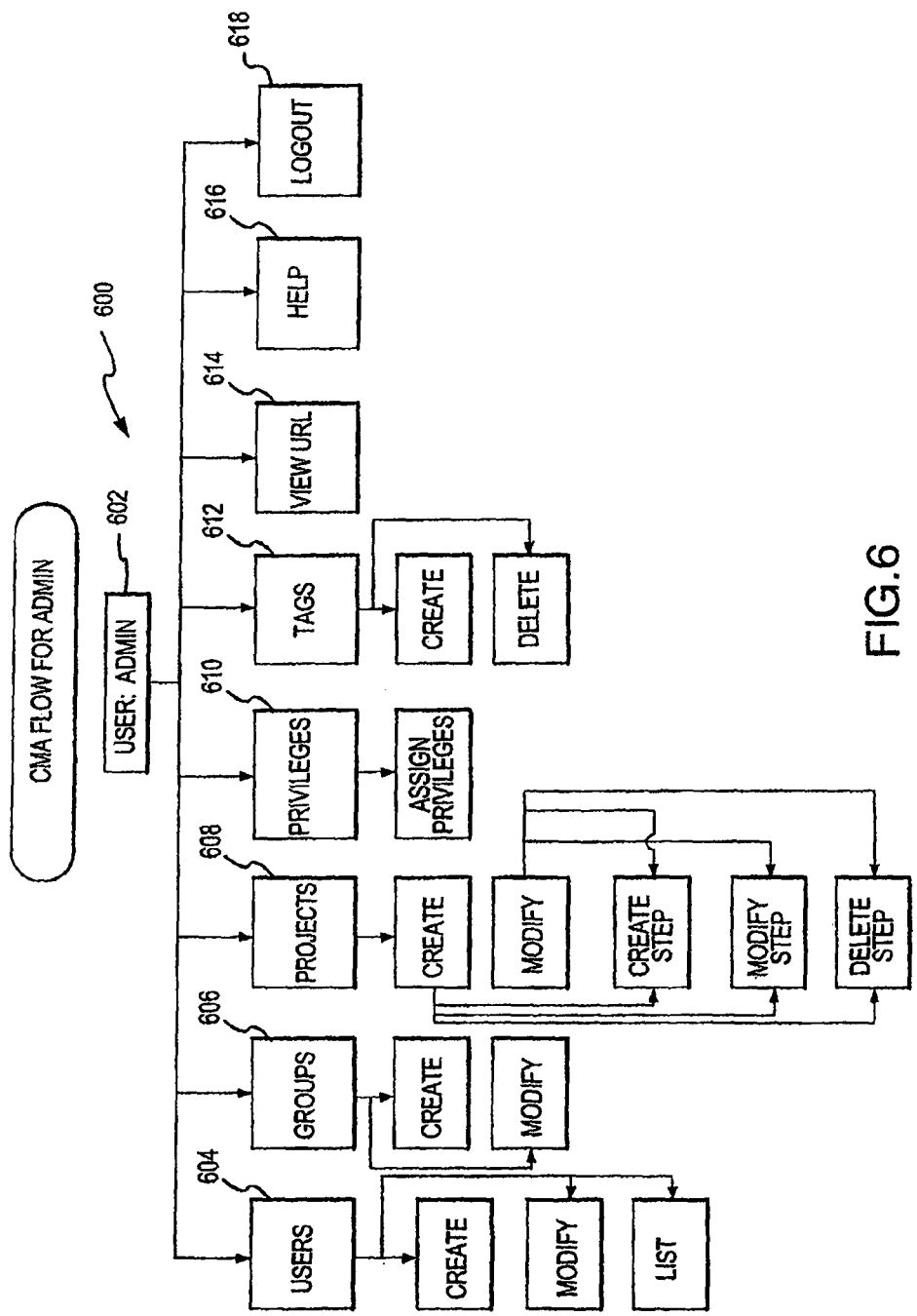
FIG. 6 is an exemplary workflow diagram for Content Management Application Administrative users.

Referring now to FIG. 6, the content management application flow for use by the site wide administrative user disclosed in FIG. 4 is shown at 600. The site wide administrative user 602 can setup workflow users 604 by creating, modifying or listing them. Next, the administrative user 602 may identify groups, creating and modifying workflow groups to include the members of the workflow users. The site wide administrative user 602 may also set out projects 608 for the group 606 to address. As certain members of the group 606 may have access only to certain portions of a project 608, the site wide administrative user assigns privileges 610 to the users 604 of a group 606. Further, the site wide administrative user can create or delete tags 612 identified with the project, view the URL 614 where the modified content will reside, request help 616 or log out from the system 618.

Figure 7:
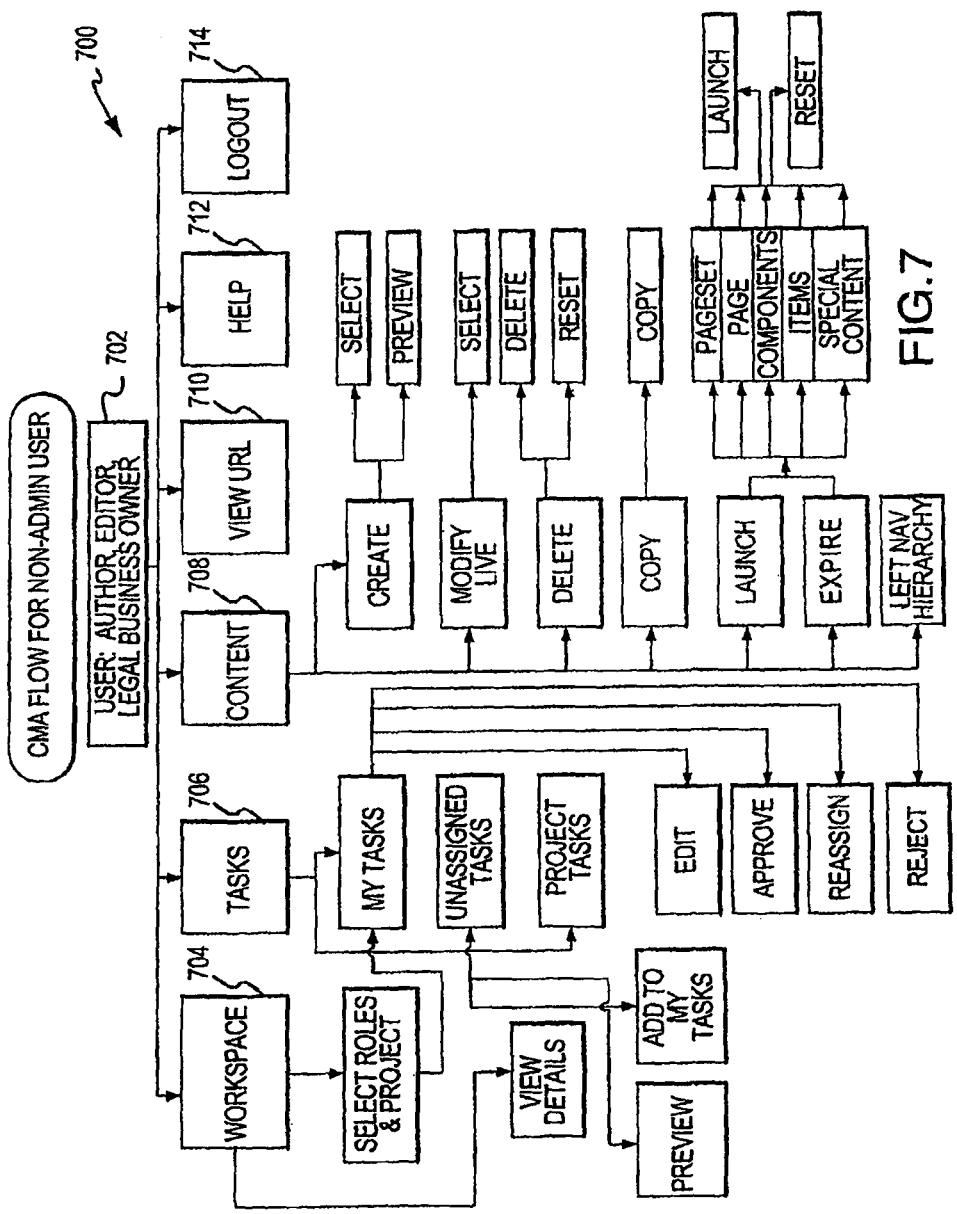
FIG. 7 is an exemplary workflow diagram for Content Management Application Non-Administrative users.

Referring now to FIG. 7, an exemplary content management application for non-administrative users is shown at 700. In this embodiment, the user 702 can be the author, editor, legal, business owner, or site administrator. The site administrator defines a work space on the production server to accommodate the changes and modifications to a new content page. The site administrator also sets tasks 706 such that when he selects roles and projects under work space 704, he can then assign the tasks to various entities or groups. As unassigned tasks are disclosed, they may be added to the tasks listed for edit, approval, reassignment, or rejection. An author then defines the content 708 of the page, starting the workflow process through the review by the editor, legal, and the business owner. Again, once the content is approved throughout the workflow, it is sent to the site administrator for launching to the production server for introduction to the worldwide web on the internet. A user may also view the URL 710 where the modified content will reside, request help 712 or log out from the system 714.

Figure 8A:
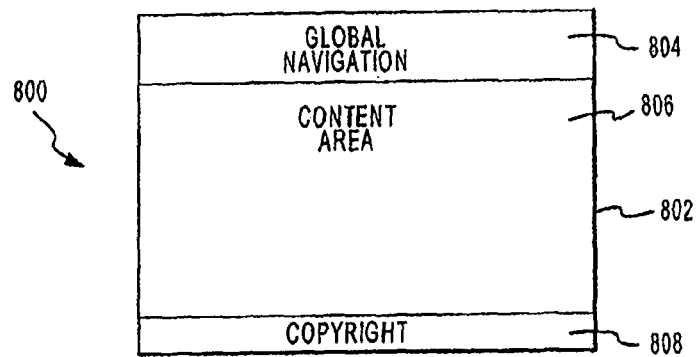
FIGS. 8a-8c are examples of screen layout templates for use in enforcing standard page layouts.
Figure 8B:
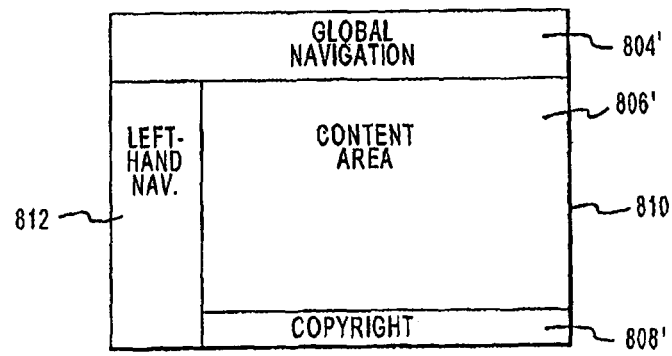
Figure 8C:
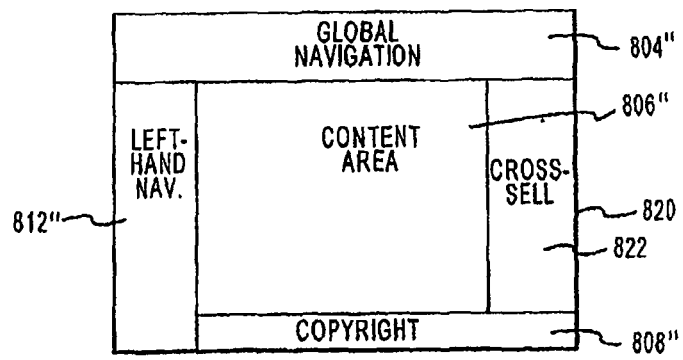

Referring now to FIG. 8a-8c, various exemplary templates are depicted at 800 for use in standardizing the content pages which will be created or modified by the workflow process for introduction to the intranet. A number of standard page types have been developed for use with the Content Management Application in order to present a common page style and layout. Page types are general descriptions of the type of information that appears on the page. As a result, templates can be set up in a simple table structure that define the overall structure of the page. The table structure divides the page into areas, each of which is assigned a specific function, such as global navigation, local navigation, content, etc. Thus, by creating templates for use across the company, consistency across the company web site can be ensured. Exemplary embodiments of such templates are depicted in FIGS. 8a-8c.

Referring particularly to FIG. 8a, there is shown an exemplary template 802 having a global navigation segment 804, a content area 806, and a copyright area 808. Copyright area 808 may include an automatic counter or automatic date stamp for correctly indicating the appropriate date of distribution next to the copyright symbol ©2000 along with the appropriate creator of the copyright. This template is used primarily for site wide utility pages which are accessible from the tool bar, such as search or Company information. It is also used for any content which falls outside of the hierarchical navigation of a segment, which will be hereinafter described. This template is generally used for searching a site, the site directory, customer service, information about the company, and as an exception, partner-hosted content.

Referring now to FIG. 8b, there is shown an exemplary segment content template 810 again having a global navigation segment 804', a content area 806' and a copyright area 808'. In addition, a let hand navigation bar 812 has been added. This navigation bar 812 provides access to various segments located in the content area 806'. This template could be used for demonstrations, demonstration introductions, acquisition/registration, interactive and non-interactive content on a fourth level or lower within the web page only site.

Referring now to FIG. 8c, there is depicted an exemplary segment content template 810 with a cross-sell column 822. As before, the segment content template with cross-sell column 820 includes a global navigation segment 804", a content area 806", a copyright area 808" and a left hand navigation column 812". The new cross-sell column 822 is used to present content, such as general information or product descriptions, product/service pages, category introduction pages, output pages and glossaries.

While only three types of templates have been described, it should be understood that other templates for other reasons and other uses can be designed and utilized for presentation of company content to the internet website. As such, these templates are by way of example only and are not by way of limitation to the style and format of templates used to present company information and content. Accordingly, corresponding structures, acts, and equivalents of all elements in the claims below are intended to include any structural material or acts for performing the functions in combination with other elements as specifically claimed. The scope of the invention should be determined by the allowed claims and their legal equivalents, rather than by the examples given above.

We claim:

1. A computer system, comprising:
    a processor; and
    a non-transitory memory having instructions that, in response to execution by the processor, cause the computer system to implement a content management application that performs operations comprising:
        permitting a user to update web page content of a web page via a web browser; and
        storing an audit log for the web page content, wherein the audit log indicates that the user updated the web page content.

2. The computer system of claim 1, wherein the storing is performed in response to the web page content being removed from the web page by the content management application.

3. The computer system of claim 2, wherein the operations further comprise:
    automatically removing the web page content in response to an auto-expiration provision within the web page content.

4. The computer system of claim 1, wherein the operations further comprise:
    prior to including the updated web page content in the web page, presenting the updated web page content to a reviewer; and
    receiving an indication of whether the reviewer approves of the updated web page content.

5. The computer system of claim 4, wherein the operations further comprise:
    in response to the reviewer rejecting the updated web page content, returning the updated web page content to the user for revision.

6. The computer system of claim 4, wherein the audit log indicates that the reviewer reviewed the updated web page content.

7. The computer system of claim 1, wherein the operations further comprise:
    providing a template for a web page to the user, wherein the template includes an area allocated for the updated web page content.

8. The computer system of claim 1, wherein the permitting includes permitting the user to update the web page content via a web browser of the user.

9. A non-transitory computer readable medium having program instructions stored thereon, wherein the program instructions are executable by a computer system to cause the computer system to perform operations comprising:
    presenting web page content to a reviewer that evaluates the web page content for inclusion in a web page; and
    saving audit information associated with the web page content, and wherein the audit information indicates that the reviewer evaluated the web page content.

10. The computer readable medium of claim 9, wherein the operations further comprise:
    receiving an indication that the reviewer has approved the web page content; and
    causing the web page content to be published to the web page.

11. The computer readable medium of claim 10, wherein the operations further comprise:
    storing the web page content as extended markup language (XML); and
    translating the web page content to hypertext markup language (HTML) prior to causing the web page content to be published to the web page.

12. The computer readable medium of claim 10, wherein the operations further comprise:
    after the web page content has been published, removing the web page content from the web page, wherein the saving is performed in response to the removing.

13. The computer readable medium of claim 9, wherein the operations further comprise:
    prior to the presenting, providing a web page template to a web browser of an author, wherein the web page template is usable by the author to create the web page content, and wherein the audit information identifies the author as an author of the web page content.

14. The computer readable medium of claim 13, wherein the operations further comprise:
    receiving an indication that the reviewer has rejected the web page content; and
    in response to the indication, sending the web page content to the author for revision.

15. The computer readable medium of claim 9, wherein the presenting is to a plurality of reviewers within a workgroup associated with the web page content.

16. A method, comprising:
    a computer system presenting a web page that is usable to create production content for a web site; and
    the computer system storing audit information for an instance of production content, wherein the audit information identifies an author of the production content and a reviewer of the production content.

17. The method of claim 16, further comprising:
    the computer system removing the instance of production content from the web site, wherein the storing is performed in response to the removing.

18. The method of claim 16, further comprising:
    the computer system presenting the instance of production content to the reviewer; and
    the computer system receiving an indication of whether the reviewer approves of the instance of production content.

19. The method of claim 18, further comprising:
    in response to receiving an indication that the reviewer approves of the instance of production content, the computer system releasing the instance of production content to a web server configured to publish the instance of production content to the web site.

20. The method of claim 18, further comprising:
    in response to receiving an indication that the reviewer does not approve of the instance of production content, the computer system returning the instance of production content to the author.

\* \* \* \* \*